Aug. 3, 1937.       D'ARCY A. YOUNG, JR., ET AL       2,088,944
TRANSPARENCY MOUNTING
Filed April 29, 1936
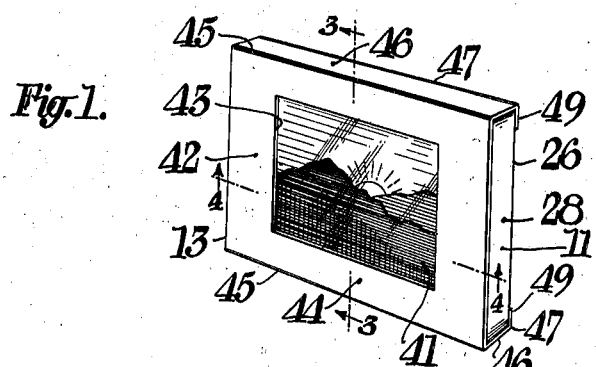
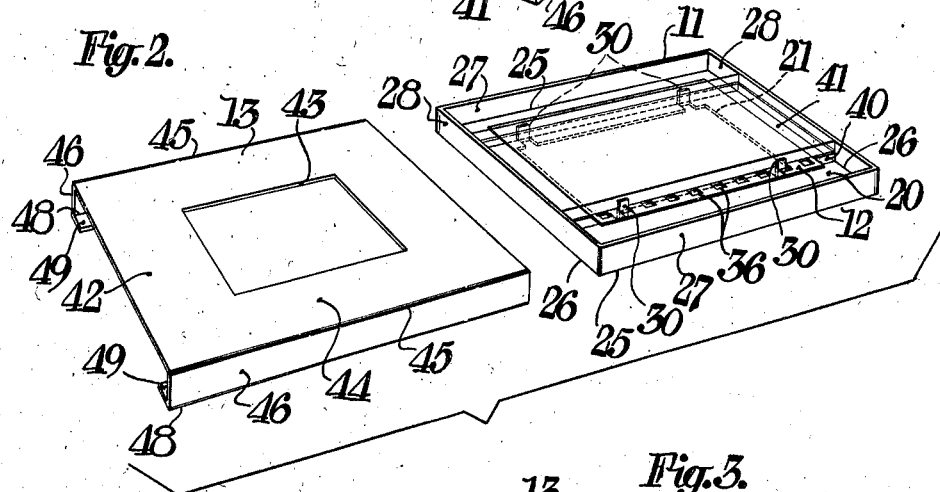
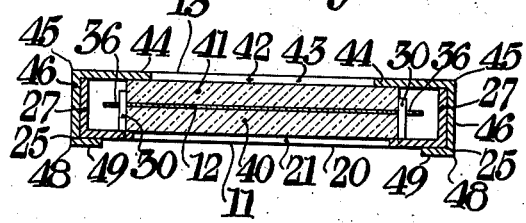
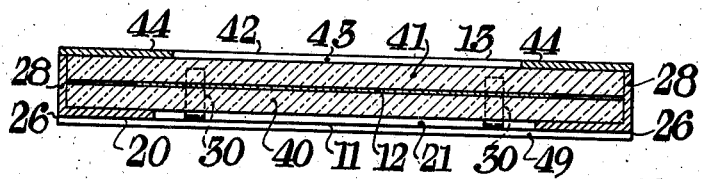
Fordyce E. Tuttle
D'Arcy A. Young, Jr.,
INVENTORS
BY
ATTORNEYS.

Patented Aug. 3, 1937

2,088,944

UNITED STATES PATENT OFFICE 2,088,944

TRANSPARENCY MOUNTING

D'Arcy A. Young, Jr., and Fordyce E. Tuttle, Rochester, N. Y., assignors, by mesne assignments, to Eastman Kodak Company, Jersey City, N. J., a corporation of New Jersey Application April 29, 1936, Serial No. 76,966

14 Claims. (Cl. 88—26)

This invention relates to a film mount adapted to hold a film area flat for viewing or projecting, and is particularly adapted for use as a lantern slide.

One object of the invention is to provide such a mount in which the film is maintained in a flat or uniplanar position so that the lines of projection will be substantially normal to the image area of the film. Another object is to provide a mount of this class which is adapted for use with films of somewhat different sizes. A further object is to provide a mount of the class described in which the film may be readily and easily positioned and held in registry with the clearance aperture. Still another object is to provide a mount for this purpose which is simple in construction, relatively inexpensive to manufacture, and highly effective in use. A still further object is to provide a mount having a sheet of glass on each side of the film to dissipate heat.

To these and other ends, the invention resides in certain improvements and combinations of parts, all as will be hereinafter more fully described, the novel features being pointed out in the claims at the end of the specification.

In the drawing:

Fig. 1 is a perspective view of a mount constructed in accordance with the preferred embodiment of the invention;

Fig. 2 is a perspective view of the mount for films with the closure member withdrawn from the tray-like film-holding member, to more clearly show the arrangement of parts.

Fig. 3 is a transverse vertical sectional view taken substantially on the line 3—3 of Fig. 1; and Fig. 4 is a longitudinal sectional view taken substantially on the line 4—4 of Fig. 1.

The same reference numerals throughout the several views indicate the same part.

The present invention is embodied in the present instance, for the purpose of illustration only, in a transparency mount primarily designed for positive 35 mm. perforated film such as is commonly used in many of the miniature cameras now on the market, and is also adapted for any small film which is to be used as a lantern slide. This mount is designed to be detachably secured to a suitable projector having a source of illumination which emits rays of light which pass through the image on the film positioned within the mount; and which project this image, highly magnified, onto a suitable viewing screen.

The mount is of a simple construction and comprises, in general, two metal frames arranged to be slidably engaged and formed with spaced opposite wall members between which the positive film is positioned and held in registry with apertures formed in said spaced wall members. This mount with its strip of film constitutes a unitary device which may be easily and quickly slid to and from an operative position in a suitable projector, and which, after use, may be readily stored when not in use. It should be noted that the mount adequately protects the film from scratching or other damage both in and out of a projector.

The term film is herein used in its generic sense to include films, plates, or any transparent materials having an image thereon, adapted for use in viewing or projecting machine.

Referring now to the drawing and particularly to Fig. 1, wherein is shown a mount for films constructed in accordance with the preferred embodiment of the invention, this mount comprises, in general, a tray-like film holding member 11 in which the positive film 12 is positioned and held, and a closure member 13 arranged to slidably engage and close the open side of the tray-like member 11, all as will be hereinafter more fully described.

The tray-like member or film holder 11 is preferably pressed, drawn, or otherwise formed from a single piece or strip of sheet material, preferably metal, to provide a bottom 20 formed with a centrally positioned clearance aperture 21 which, by preference, is slightly smaller than the bottom 20, as clearly illustrated in the drawing. The metal strip formed into a tray-like member is bent along the lines 25 and 26 to form side walls 27 and end walls 28. These side and end walls extend upwardly from the bottom 20 to provide a shallow tray-like receptacle for suitably positioning and holding the film 12 in registry with the clearance aperture 21.

To facilitate the accurate and ready positioning of the film 12 in this tray-like member, the present invention provides suitable film positioning means preferably in the form of upstruck lugs 30 formed from the bottom 20 adjacent the sides 27 and intermediate said sides and the clearance aperture 21. These lugs are arranged to extend through the marginal perforations 36 of the film 12 to position the latter in proper registry with the clearance aperture 21. While the present embodiment has shown four of such lugs, it is to be fully understood that this is by way of illustration only, as it is contemplated that a larger or smaller number of such positioning lugs may be used.

It is well known by those familiar with the art, that films have a tendency to curl. This tendency is more pronounced when the film is placed in the direct rays of, or in heat communication with, a light source such as an electric lamp used in a projector. It is also known to those in the art, that the most effective projection is secured when the light rays emitted by the light source pass through the film substantially normal to the image area thereof. To overcome this tendency of the film to curl, and to maintain the film in position so that the light rays pass therethrough substantially normal to the image area, the present invention provides suitable means for clamping and holding the film in flat position and substantially in a plane.

This clamping means comprises, in the preferred embodiment, two strips or sheets of rigid transparent material such, for example, as glass strips 40 and 41 between which the film 12 is maintained in flat position, the glass also dissipating the heat which might otherwise damage the film. The lower strip 40 is positioned below the film 12 and rests on the bottom 20 adjacent the clearance aperture 21. The upper strip 41, on the other hand, overlies and is supported by the film strip 12, as clearly shown in Figs. 3 and 4. These strips thus engage opposite faces of the film and securely hold or clamp the latter in flat position.

The strips are preferably of a width equal to the distance between opposite rows of positioning lugs 30, and a length substantially equal to the sides 27. These positioning lugs are all preferably of a length slightly greater than the combined thickness of the lower strip 40 and the film 12, so that the lugs also engage the edges of the upper strip 41, as clearly illustrated in Fig. 3. By means of this arrangement, the lugs 30 and the ends 28 of the member 11 engage the sides and ends respectively of the two glass strips 40 and 41 to maintain the strips in position in the member 11.

The open side of the traylike member 11 is closed by a suitable closure member, generally indicated by the numeral 13, which is stamped, drawn, or otherwise formed from a single piece of slightly resilient or flexible sheet material, preferably metal, to provide a top 42 having a centrally arranged masking aperture 43 adapted to be brought into registry with the clearance aperture 21. The masking aperture 43 is slightly smaller than the aperture 21 and serves to frame the picture projected upon a screen or viewed in a viewing device.

This masking aperture 43 is, by preference, slightly smaller than the top 42 to provide marginal portions 44, the under surfaces of which are adapted to engage the upper surface of the glass strip 41 to hold the latter in clamping engagement with the film 12. These marginal portions 44 thus cooperate with the strips 40 and 41 and the lugs 30 to position and hold the film in registry with the apertures 21 and 43. The portions 44, the glass strips 40 and 41, and the lugs 30 may, therefore, all be broadly considered as positioning means for the film 12.

The sheet, from which the closure member 13 is formed, is bent along the parallel lines 45 to provide depending side walls 46 arranged to frictionally engage and overlie the sides 27 of the member 11, as clearly shown in Fig. 3. The lower part of the side walls 46 are bent along the parallel lines 48 to form inturned flanges 49 which overhang the top 42 and are preferably spaced therefrom a distance slightly less than the depth of the tray-like member 11.

As the material from which the member 13 is formed is of a resilient nature, the flanges 49 yieldably engage the exposed face of the bottom 20 and thus retain the members 11 and 13 in frictional engagement; but permit the member to be easily and quickly separated when desired. The frictional engagement of the side walls 46 and the sides 27 cooperates with the yielding pressure of the flanges 49 to maintain the parts in assembled relation.

It is apparent from the above description that the present invention affords a lantern slide mount or film holder in which the film is not only properly positioned relative to the masking and clearance apertures; but is also clamped or held substantially in a plane. It is also evident that the mount disclosed herein is of a compact arrangement which may be readily assembled, yet which may be quickly taken apart to replace the strip of film. When not in use, the mounts may be suitably stacked for storage or shipping, and the holder adequately protects the delicate surfaces of the film at all times.

In assembling, the traylike member 11 is held in the inverted position, as shown in Fig. 2. The lower glass strip 40 is then placed on and supported by the bottom 20. The film 12 is then laid over the glass 40 so that the lugs 30 project through the perforations 36 of the film 12. After which, the upper glass 41 is positioned over the film, the lug 30 and the ends 28 limiting the movement of both the upper and lower glass strips 40 and 41. As the parts are thus assembled, the tray-like member is then slid into the closure member 13 between the top 42 and the flanges 49, the latter yieldably engaging the exposed face of the bottom 20 to retain the parts in assembled relation.

While one embodiment of the invention has been shown, it is understood that the inventive idea may be carried out in a number of ways. This application is, therefore, not to be limited to the precise details disclosed, but is intended to cover all variations and modifications thereof falling within the spirit of the invention and the scope of the appended claims.

What we claim as new and desire to secure by Letters Patent of the United States is:

1. A lantern slide mount comprising in combination, a tray like member adapted to hold a film, a detachable closure member for said tray like member, said members being formed with registering apertures, and positioning means including a plurality of upstruck lugs formed from one of said members adjacent the aperture thereof, said lugs being arranged to engage said film adjacent margins thereof to position said film in registry with said apertures.

2. A lantern slide mount comprising in combination a tray like member adapted to hold a film, a detachable closure member for said tray like member, said members being formed with registering apertures, separate means for clamping said film substantially in a plane, and positioning means associated with one of said members for positioning said film in registry with said apertures.

3. A lantern slide mount comprising in combination, a tray like member adapted to hold a film, a detachable closure member for said tray like member, said members being formed with registering apertures, means including sheets of transparent material removably mounted in said tray-like member for clamping said film substantially in a plane, and means for positioning said film in registry with said apertures.

4. A lantern slide mount comprising in combination, a tray like member adapted to hold a film, a detachable closure member for said tray like member, said members being formed with registering apertures, stationary positioning means including parts integral with one of said members and arranged to engage said film adjacent margins thereof to position said film in registry with said aperture, and means independent of said tray-like member by cooperating therewith for clamping said film in a substantially flat position.

5. A lantern slide mount comprising in combination, a tray like member adapted to hold a film, a detachable closure member for said tray like member, said members being formed with registering apertures, stationary positioning means including parts integral with one of said members and arranged to engage said film adjacent margins thereof to position said film in registry with said aperture, means including strips of transparent sheet material supported by said tray-like member and arranged on opposite faces of said film to clamp the latter substantially in a flat position.

6. A lantern slide mount comprising in combination, a tray like member adapted to hold a film, a detachable closure member for said tray like member, said members being formed with registering apertures, means including sheets of transparent material arranged to engage said film to hold the latter in a substantially flat position, and means including upstruck lugs formed from one of said members and cooperating with said transparent material to position said film in registry with said apertures.

7. A lantern slide mount comprising in combination, a tray like member adapted to hold a film, a detachable closure member for said tray like member, said members being formed with registering apertures, and positioning means including lugs associated with said first mentioned member to position said film in registry with said apertures, said closure member having parts thereof arranged to contact said positioning means and cooperating therewith to hold said film in position.

8. A lantern slide mount comprising in combination, a tray like member adapted to hold a film, a detachable closure member for said tray like member, said members being formed with registering apertures, and positioning means including a plurality of upstruck lugs formed from one of said members adjacent the aperture thereof, said lugs being arranged to engage said film adjacent margins thereof to position said film in registry with said apertures, said closure member having parts thereof arranged to engage said positioning means and cooperating therewith to hold said film in position.

9. A lantern slide mount comprising in combination, a tray like member adapted to hold a film, a detachable closure member for said tray like member, said members being formed with registering apertures, means including sheets of transparent material arranged to engage opposite faces of said film to clamp the latter substantially in a plane, and means including parts integral with one of said members for positioning said film in registry with said apertures, said closure member having parts thereof arranged to slidably engage said transparent material and cooperating therewith and with said positioning means to hold said film in position in said tray like member.

10. A lantern slide mount comprising in combination, a tray like member having a bottom and sides, said bottom having a clearance aperture formed therein, a film disposed within said member and spaced from said bottom, positioning means integral with said bottom adjacent said aperture and arranged to engage said film adjacent the margins thereof to position the film in registry with said apertures, strips of transparent sheet material arranged on opposite faces of said film to clamp the latter substantially in a flat position, and a closure member arranged to slidably engage said tray like member and being formed with a masking aperture arranged to be brought in registry with said clearance aperture, said closure member having parts adjacent said masking aperture adapted to engage said sheet material to cooperate therewith and with said positioning means to position and hold said film in registry with said apertures.

11. A lantern slide mount comprising in combination, a tray like member having a bottom and sides, said bottom having a clearance aperture formed therein, a film disposed within said member and spaced from said bottom, lugs struck up from said bottom and arranged to engage said film adjacent the margins thereof to position the film in registry with said aperture, a lower strip of sheet material positioned beneath said film and supported by said bottom, an upper sheet supported by said film and cooperating with said lower sheet to clamp said film substantially in a plane, said sheets engaging said lugs and said sides and being held thereby against movement, a closure member arranged to slidably engage said tray like member and having a part thereof formed with a masking aperture arranged to register with said clearance aperture, and parts on said closure member adjacent said masking aperture arranged to engage said upper sheet and cooperating with said sheets and said lugs to both position and hold said film in registry with said apertures.

12. A lantern slide mount comprising in combination, a tray-like member adapted to hold a film, a detachable closure member for said tray-like member, said members being formed with registering apertures, means separate from said tray-like member for clamping said film substantially in a plane, and positioning means formed from one of said members for both positioning said film in registry with said apertures and for maintaining said clamping means in position in said tray-like member.

13. A lantern slide mount comprising in combination, a tray-like member adapted to hold a film, a detachable closure member for said tray-like member, said members being formed with registering apertures, means removably mounted in said tray-like member and arranged to engage said film to clamp the latter in flat position, and upstruck lugs formed from one of said members and engaging said film and said clamping means adjacent edges thereof to positively position said film and said clamping means in said tray-like member.

14. A lantern slide mount comprising in combination, a tray-like member adapted to hold a film, a detachable closure member for said tray-like member, said members being formed with registering apertures, sheets of transparent material arranged on opposite faces of said film to clamp the latter in flat position in said tray-like member, and upstruck lugs formed from one of said members and arranged to engage said film adjacent the edges thereof to position said film in registry with said apertures, said lugs also engaging edges of said sheets to position the latter in said tray-like member.

D'ARCY A. YOUNG, Jr.
FORDYCE E. TUTTLE.